Sept. 30, 1958 — C. W. BURNHAM — 2,853,760
SAFETY HOOK
Filed Aug. 3, 1954 — 2 Sheets-Sheet 1
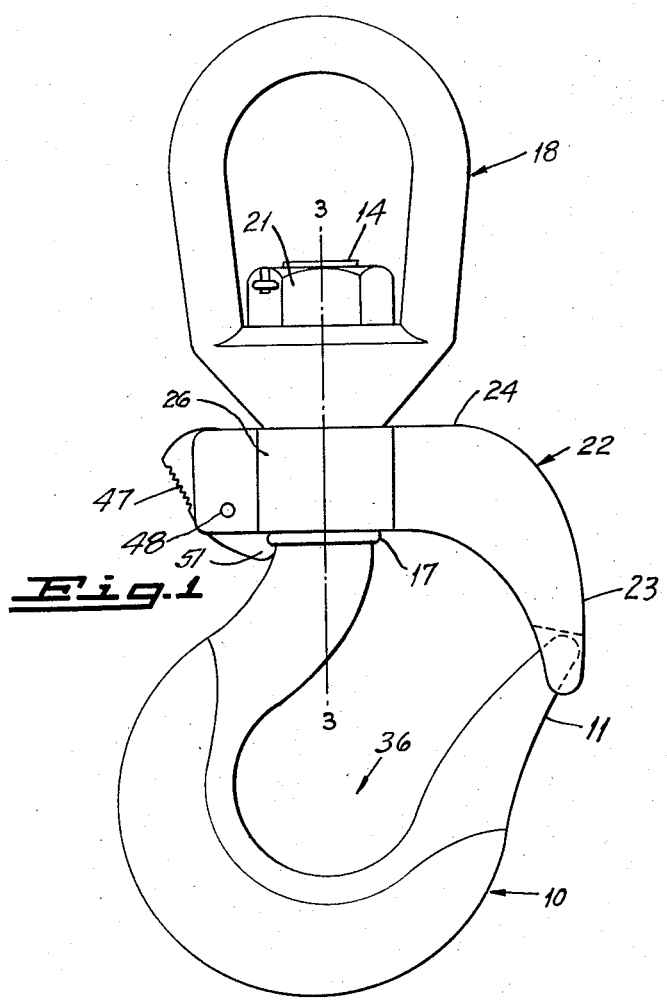
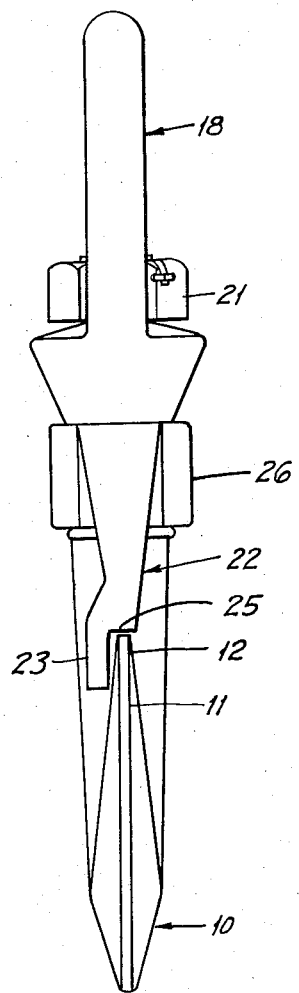
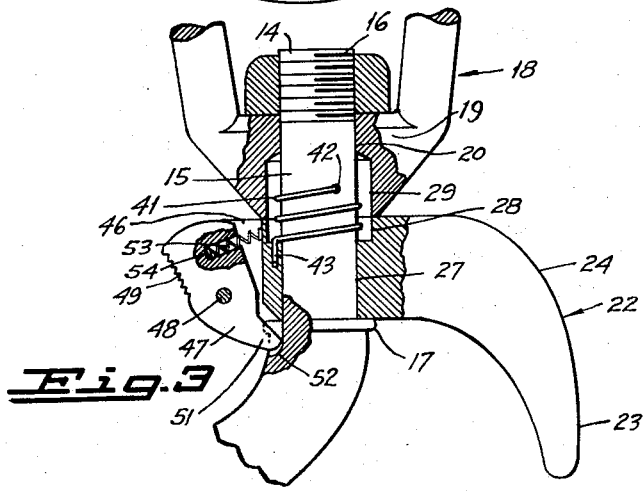
INVENTOR.
Claude William Burnham
ECKHOFF & SLICK
ATTORNEYS
A MEMBER OF THE FIRM Sept. 30, 1958 C. W. BURNHAM 2,853,760
SAFETY HOOK
Filed Aug. 3, 1954 2 Sheets-Sheet 2
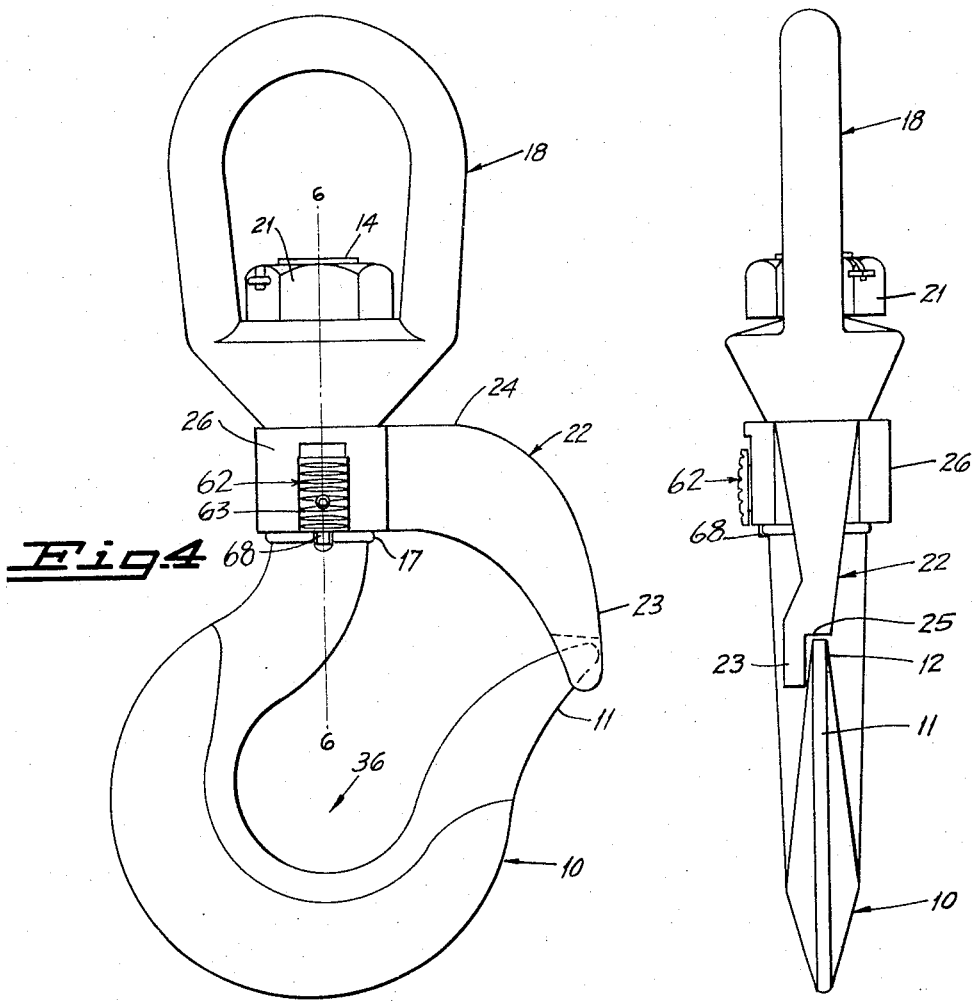
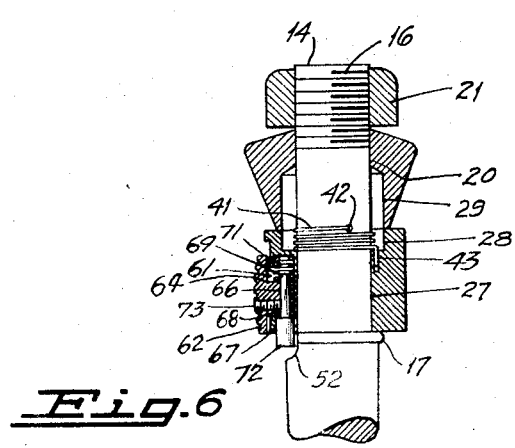
INVENTOR.
Claude William Burnham
ECKHOFF & SLICK
ATTORNEYS
BY
A MEMBER OF THE FIRM

# United States Patent Office 2,853,760
Patented Sept. 30, 1958

2,853,760

SAFETY HOOK

Claude William Burnham, Sacramento, Calif., assignor to E. D. Bullard Company, a corporation of California Application August 3, 1954, Serial No. 447,601

2 Claims. (Cl. 24—241)

This invention relates to handling or hoisting devices and, more particularly, to a safety hook.

In my prior application, Serial No. 336,347, filed February 11, 1953, now Patent No. 2,728,967, granted January 3, 1956, I have disclosed a successful safety hook which included a hook having a safety arm rotatably mounted upon the shank of the hook and movable into and out of a hook throat closing position. The safety arm utilized to close the throat was retained in throat-closing position by a pin movable into and out of a position in which it fitted in a groove provided in the shank and the arm mounting. This hook was quite successful and met with widespread commercial success. It has been subject to objection, however, in that the locking pin must be machined with accuracy to provide a uniformly nice fit. Further, in use, the projecting end of the pin was subject to damage.

The hook of the present invention overcomes these objections in that the locking of the arm against rotation on the shank is accomplished by a relatively simple and rugged catch member which engages a slot on the hook proper.

It is in general the broad object of the present invention to provide a novel, simple and improved safety hook which includes a relatively simple and rugged manually operable latch or lock for maintaining a safety arm locked in position.

The invention includes other objects and features of advantage, some of which will become further apparent upon consideration of the following. In the drawing accompanying and forming a part hereof, Figure 1 is a side elevation of the safety hook constructed in accordance with the present invention.

Figure 2 is an end view of the hook shown in Figure 1, while Figure 3 is a fragmentary view taken generally along the line 3—3 in Figure 1 and broken away to illustrate construction of the locking means.

Figure 4 is a side elevation of another form of safety hook constructed in accordance with the present invention, while Figure 5 is an end view of the hook shown in Figure 4, and Figure 6 is a fragmentary view taken generally along the line 6—6 in Figure 1, broken away to illustrate the construction of the locking means.

Referring in detail to the drawing, the numeral 10 designates a hook which may be made of any suitable material such as a metal forging. The hook 10 includes a curved portion 11, terminating in a pointed end 12, and an integral shank 14. The shank 14 includes a cylindrical portion 15 and a threaded end 16. An annular shoulder 17 is provided contiguous to the lower end of the cylindrical portion 15.

Mounted on the shank 14 is a ring member 18, adapted to be attached to a hoisting cable, line, or the like. The ring 18 includes a central web 19 which is provided with an opening 20 for mounting on the shank 14. A suitable securing element such as a nut 21 is arranged in engagement with the threaded end 16 of the shank 14 to maintain the parts in their assembled relation.

The hook 10 is shaped to define a throat 36 which is adapted to receive therein a sling or the like. A latch or safety arm 22, Figure 5, is provided for closing the throat 36. The arm 22 includes portions 23 and 24 which are arranged angularly with respect to each other, the end of the arm being provided with a cut-out 25 for receiving the pointed end 12 of the hook 10 when the arm 22 is in bridging or closing relation with respect to the throat 36.

The arm 22 is also provided with a hub or boss 26 formed thereon, having a bore 27 fitting the cylindrical portion 15 of the shank 14, the boss resting against the annular shoulder 17. The bore includes an enlarged portion 28, corresponding to a similarly enlarged bore 29 in the opening 20 of the web 19. A coiled spring 41 is mounted about the shank 14, the spring having one end 42 engaged with the shank and the other end, 43, engaged with the hub 26 on arm 22 and normally biasing the arm into a throat closing position, as in Figures 1 and 2.

In accordance with this invention, improved means are provided for locking the safety arm against rotation on the supporting shank 14. To effect this, that end of the boss 26 on arm 22 opposite portion 24 is bifurcated as at 46 and a lever 47 is mounted in such bifurcation upon a pin 48. The upper end of the lever is knurled as at 49 for ready manipulative engagement with a finger, while the other end 51 of the lever is formed for reception in a slot 52 provided in flange 17 and that portion of the hook immediately beneath the flange 17, as is shown in Figure 3. A spring 53 is provided in a recess 54 in lever 47, the spring resting against the opposite wall of the boss.

In operation, the normal position of the safety arm on the hook is as shown in Figures 1 and 2, in which arm 22 closes the throat of the hook and lever 47 engages slot 52 to retain the arm in throat-closing position. If it is desired to attach something to the hook or remove something from engagement with the hook, it is only necessary to press the upper end of lever 47 toward shank 41 and so release its opposite end 51 from engagement with slot 52. By then applying a rotating force, the arm can be swung into open position. The arm is returned automatically to closed position upon release of the arm by the tension in spring 41, lever 47 automatically latching the arm in throat-closing position.

In that form of the invention shown in Figures 4, 5, and 6, latching of the safety arm is effected by providing a recess 61 in the side of the boss 26, the recess extending parallel to the longitudinal axis of shank 14. A latching member 62 is mounted slidably in the recess. The member 62 includes a serrated finger grip 63 and a stem 64, the latter fitting slidably the recess. A passage 66 is provided in the stem 64, the passage 66 extending parallel to the axis of the shank 14. The underside of the boss 26 is provided with a passage 67 in axial alignment with passage 66. A pin 68 is inserted in the passages 66 and 67 with one end 69 engaged with a spring 71 provided between the pin end and the recess 61. The other end 72 of the pin is enlarged for reception into notch 52 in the shoulder 17. The pin 68 is secured in place under a desired spring tension forcing it toward notch-engaging-position by set screw 73 mounted in the member 62.

The latching mechanism described is relatively simple and does not depend upon any nice machine fit between rotating parts; further, slot 52 is provided in that portion of the hook below the shank so the extent of the shank is not reduced. Further, the forces required to open the hook are such that any force which will move lever 47 into its arm release position will not open arm 22 and, conversely, any force which will move arm 22 into open position, will not release the lever 47 from latching position.

I claim:

1. In combination, a hook provided with a throat and including a curved portion terminating in a terminal end; a shank extending from the hook and including a cylindrical portion; a safety arm including a hub mounted for rotation on the cylindrical portion of the shank and having an arm extending from said hub, said safety arm being rotatable on said cylindrical portion to move said arm into and out of a throat-bridging position and engagement with said terminal end; a spring coiled about the cylindrical portion of the shank and having one end engaged with the shank and the other end engaged with the safety arm to bias the safety arm into throat-bridging position; said hook being provided with a slot extending below said cylindrical portion; and a lever mounted in said hub and movable in a plane parallel to the longitudinal axis of the shank to engage and release said slot.

2. In combination, a hook provided with a throat and including a curved portion terminating in a terminal end; a shank extending from the hook and including a cylindrical portion; a safety arm including a hub mounted for rotation on the cylindrical portion of the shank and having an arm extending from said hub, said safety arm being rotatable on said cylindrical portion to move said arm into and out of a throat-bridging position and engagement with said terminal end; a spring coiled about the cylindrical portion of the shank and having one end engaged with the shank and the other end engaged with the safety arm to bias the safety arm into throat-bridging position; said hook being provided with a slot extending below said cylindrical portion; said hub being bifurcated and having a lever mounted in said bifurcation in said hub, said lever being movable in a plane parallel to the longitudinal axis of the shank to engage and release said slot.

References Cited in the file of this patent

UNITED STATES PATENTS

| 48,520 | Ingebrigtsen | June 10, 1919 |
| 1,787,318 | Matthews | Dec. 30, 1930 |

FOREIGN PATENTS

| 174,853 | Canada | Feb. 6, 1917 |